United States Patent [19]

Warden

[11] Patent Number: 5,154,027
[45] Date of Patent: Oct. 13, 1992

[54] DEPLOYABLE/RETRACTABLE MAST INDEPENDENTLY ROTATABLE WHEN DEPLOYED

[75] Inventor: Robert M. Warden, Santa Barbara, Calif.

[73] Assignee: AEC-Able Engineering Co., Inc., Goleta, Calif.

[21] Appl. No.: 758,266

[22] Filed: Aug. 26, 1991

Related U.S. Application Data

[63] Continuation of Ser. No. 390,701, Aug. 7, 1989, abandoned.

[51] Int. Cl.⁵ .............................................. E04H 12/18
[52] U.S. Cl. ........................................ 52/108; 52/121; 52/645; 343/880
[58] Field of Search ............... 52/108, 109, 110, 645, 52/646, 121; 343/880 X, 915, DIG. 2

[56] References Cited

U.S. PATENT DOCUMENTS

| | | | |
|---|---|---|---|
| 3,486,279 | 12/1969 | Webb | 52/108 |
| 4,480,415 | 11/1984 | Truss | 52/108 |
| 4,532,742 | 8/1985 | Miura | 52/646 X |
| 4,651,589 | 3/1987 | Cambert | 52/108 X |
| 4,662,130 | 5/1987 | Miura et al. | 52/108 |

Primary Examiner—David A. Scherbel
Assistant Examiner—Creighton Smith
Attorney, Agent, or Firm—Donald D. Mon

[57] ABSTRACT

A deployable and retractable mast which can be rotated while deployed, using only one drive means for all three functions. Flexible longerons carry followers which pass through guides in a storage cannister for transition between a coiled retracted condition and an extended deployed condition. The followers pass through a gate opening, past a gate, and when the mast is rotated, the gates enable or prevent followers from taking the longerons into the retracted condition, and entitles rotation of the mast when retraction is disabled.

8 Claims, 4 Drawing Sheets

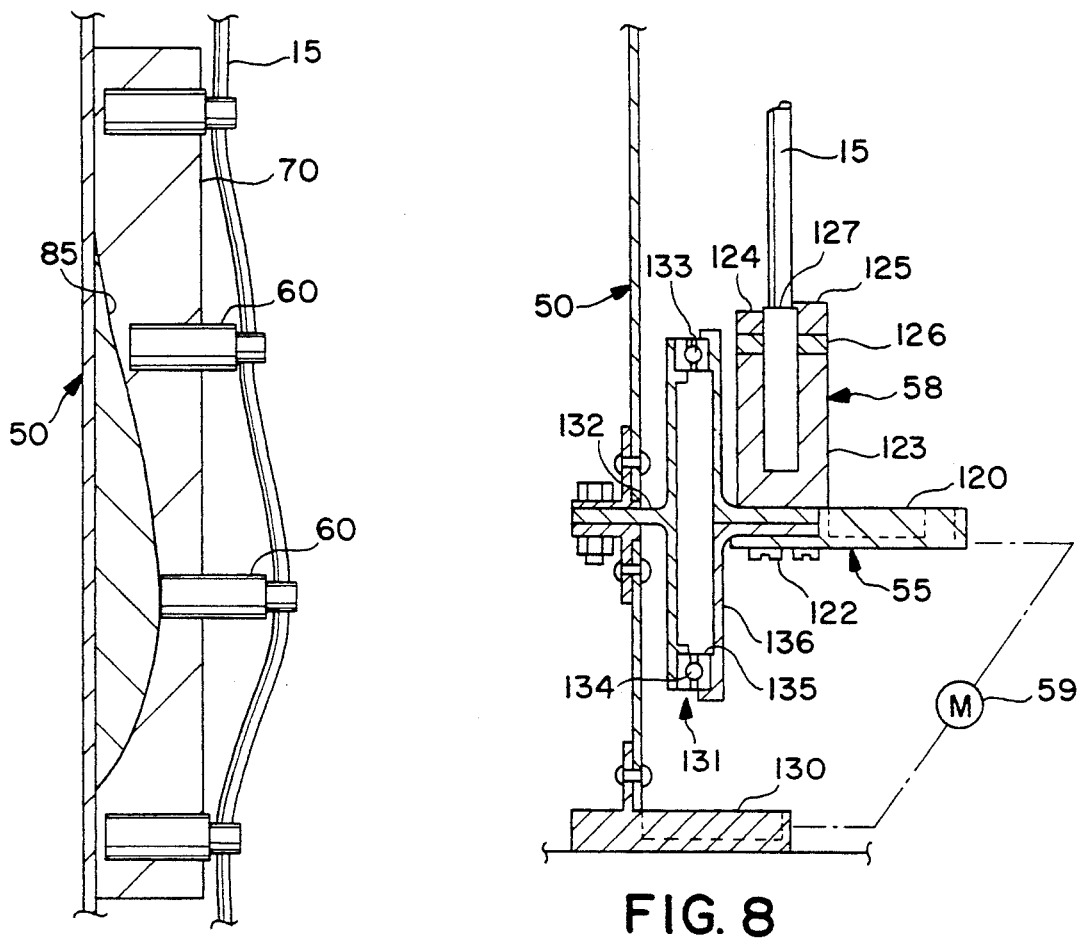
FIG. 7
FIG. 8
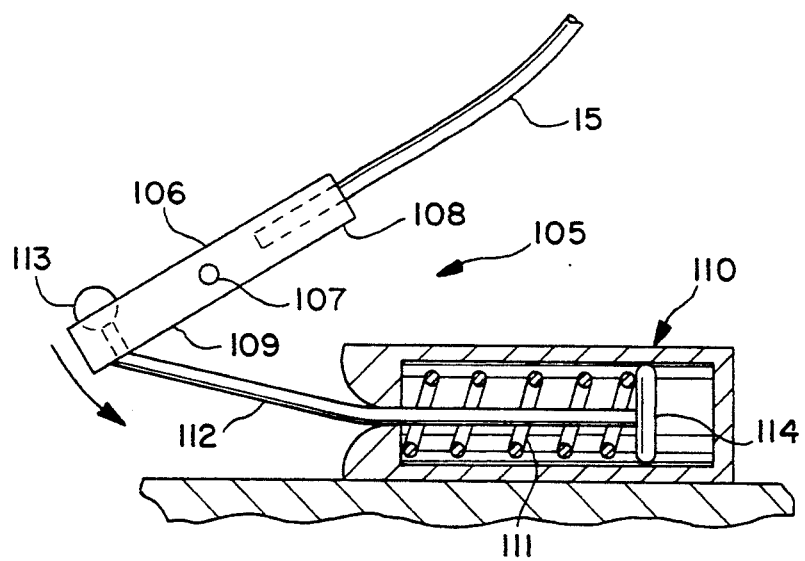
FIG. 9

DEPLOYABLE/RETRACTABLE MAST INDEPENDENTLY ROTATABLE WHEN DEPLOYED

This is a continuation of co-pending application Ser. No. 07/390,701 filed on Aug. 7, 1989 now abandoned.

FIELD OF THE INVENTION

This invention relates to masts which are retractable and deployable, and which when deployed are also rotatable.

BACKGROUND OF THE INVENTION

Masts to support objects at a height or distance from a base are widely used. Common examples are antennas, and supports for instruments and solar panel packages. The fields of application of these masts are wide and diverse. Communication systems in the field is one example. The support of instrument packages on a space vehicle is another.

Where it is feasible to provide the mast as a permanent installation to be assembled in place from separate components, there is little difficulty. However, when the mast must be conveyed in an already assembled condition to some selected place to be installed, a conventional pre-assembly procedure is not acceptable. Battlefield antennas, and spacecraft installations where the erected antenna will project beyond the spacecraft structure, are examples of situations where time and circumstances do not permit a leisurely assembly or where a pre-assembled device cannot be employed because it exceeds the dimensions which can conveniently be transported, or which in use projects beyond allowable limits. For such situations, the mast must not only be pre-assembled, but also must be stored in a retracted condition in an envelope of much-reduced dimensions and volume. For example, a ratio of 50:1 for the deployed length of a mast relative to its retracted, stored condition, is a conventional objective.

A 50 foot mast cannot readily be carried around a battlefield, and certainly cannot project from a space vehicle at launch time. The same mast, packed into a cannister can be carried around a battlefield and quickly be set up, or can be packed in a cannister in a space vehicle so it can tolerate launch forces, and later in weightless space be erected. Deployable masts, including triangular lattice masts, are well-known. A conventional example is shown in James E. Webb U.S. Pat. No. 3,486,279, issued Dec. 30, 1969 which is incorporated herein by reference in its entirety for its showing of the basic structure of a mast according to this invention.

The capacity of a mast to be deployable is well-shown in the referenced Webb patent, which is suitable for a wide range of mast applications. For example, assume that a non-directional antenna or instrument package is to be supported. Then any position of a supported load or structure is acceptable. An example is a magnetometer, which requires no specific directional orientation.

However, consider a solar panel whose surfaces must be specifically oriented relative to the sun, or a directional antenna which must be directed toward a specific point. Then, because the basic support structure such as a space vehicle cannot be expected to be oriented for the benefit of only one of its systems, then the system itself must be oriented. A basic feature of this orientation is rotatability of the deployed mast around its axis. This is a requirement for many, even most, deployable mast systems, and this objective has in fact extensively been commented on, and has been provided for.

There is an obvious "brute force" solution to this requirement. It is to provide a cannister for the storage and later support of an extensible mast, and then to provide means to rotate the cannister. This has in fact been done. While it fulfills the requirements for retraction, deployment and rotation, it requires two sets of controls and drive means-one for retraction and deployment, and another for rotation of the entire assembly.

Such an arrangement would not be intolerable for a fixed installation on earth which did not require portability or minimization of weight. However, where weight, bulk, circuitry and complexity of structure should be minimized, a dual drive involves penalties that ought to be averted. The basic problem is that reversing the direction of drive also retracts the mast, and vice versa. This precludes the rotation of the deployed mast independently of a retraction or deployment movement. For this reason, independent drive systems are provided for deployment/retraction and for rotation. Because masts of this type are used in situations regarded as portable, these are very costly penalties. Additional throw-weight on space vehicles is astonishingly expensive. Additional weight for a device to be carried on the battlefield can be deadly.

It is an object of this invention to provide a triangular lattice structure deployable to form a mast, and retractable to a helical configuration, together with means to enable it to be rotated independently of its supporting structure by the same drive mechanism as is used to deploy and to retract it.

In considering this invention, it should be borne in mind that the mast when erected is a triangular lattice structure which when deployed is quite rigid and self-shape retaining. It constitutes three longerons located at the apices of an equilateral triangular cross-section. These longerons are made of unidirectional fiberglass rods which are stiffly flexible and inherently tend to return to a straight line shape. They are, however, flexible enough to be coiled into a cylindrical cannister in a helical shape. A batten frame is formed of three batten members which extend between respective pairs of apices. Their dimensions are such that, when the structure is erected, they are bowed in an Euler type deflection which maintains a separative force between the longerons. Stability and the Euler forces are maintained by a group of flexible diagonal members whose essential properties are tensile strength and compressive collapse.

Such a structure when employed has remarkable columnar properties, but it can also be coiled into a cylindrical cannister. When rotated by drive means it passes through a transition section which converts the shape from a helix to a prismatic column or vice versa.

This is not as simple as it sounds, because these mast constructions have peculiarities of their own, depending on the flexural properties of the longerons and the batten members, and their relative dimensions. For example, in some relationships, unless provision is made in the transition section to avert it, the mast can emerge not as a prismatic structure, but as a stable twisted structure. This must be prevented.

Whatever the situation, the purpose is to erect from a stored coiled, helical structure, a triangular lattice mast with significant resistance to bending failure and columnar collapse, and in addition to enable the deployed mast to be rotated by the same drive means as is used to deploy and to retract the mast.

BRIEF DESCRIPTION OF THE INVENTION

A mast structure according to this invention when deployed is a triangular lattice structure comprising three longerons, each of which is stiffly flexible, and which when unrestrained tends to become straight. The longerons when straight are parallel to one another. They are sufficiently flexible to be coiled into a helical shape for storage.

At spaced apart nodes, batten members interconnect adjacent longerons. The batten members are springily flexible, and when the mast is deployed, they are end-loaded so they are bowed in an Euler compression mode to exert separative forces to maintain the longerons spaced apart from one another.

Flexible diagonal members interconnect the longerons at the attachment points of the batten members at the nodes. The diagonal members have tensional strength, but are readily collapsed. Cables or chains are examples of such a member. The diagonal members maintain the batten members in compression when the mast is deployed, and limit the radial excursion of the longerons.

The cannister includes a transition section through which the longerons are extruded or retracted, giving guidance such that the mast structure emerges as a triangular prism, untwisted, from the cannister, and returns to a coiled arrangement when retracted.

The longerons are connected to a rotatable bi-directional drive base or turntable in the cannister. Rotation in one direction will tend to deploy the mast, and rotation in the other direction will tend to retract it.

This is a conventional arrangement. The invention constitutes improvements to this known arrangement, which enable the same drive means to retract and deploy the mast, and also to rotate the mast when deployed.

According to one feature of this invention, the longerons are provided at their nodes with guide followers which engage guide rails in the transition section during the retraction and deployment procedures. However, means is provided to enable the followers to rotate freely of circumferential restraint so the mast can also be rotated freely when the mast is fully deployed. Said means can be actuated again to cause engagement of the followers and the rails, so that the deployed mast can be retracted, thereby enabling a single drive to provide for the retraction, deployment, and rotation of the mast.

According to a preferred but optional feature of the invention, bias means is provided to bias the coiled longerons toward a datum position in the cannister so as to provide to, and extract from, the transition section, longerons at a predictable and constant orientation when they enter and leave the transition section.

According to yet another preferred but optional feature of the invention, interengagement means between the followers and the guide rails provide for increased lateral stability of that portion of the mast which projects out of the cannister.

According to still another optional feature of the invention, an upper drum may be provided, rotatable on the cannister after the mast is fully deployed, to provide additional lateral stability to the deployed mast.

The above and other features of this invention will be fully understood from the following detailed description and the accompanying drawings, in which:

BRIEF DESCRIPTION OF THE DRAWINGS

FIG. 7 is a fragmentary view of the transition section of FIG. 3;

FIG. 8 is a fragmentary cross section of the turntable support and of the mounting means for the longerons;

FIG. 9 is a semi-schematic showing of another embodiment of mounting means for the longerons;

DETAILED DESCRIPTION OF THE DRAWINGS

Figure 1:
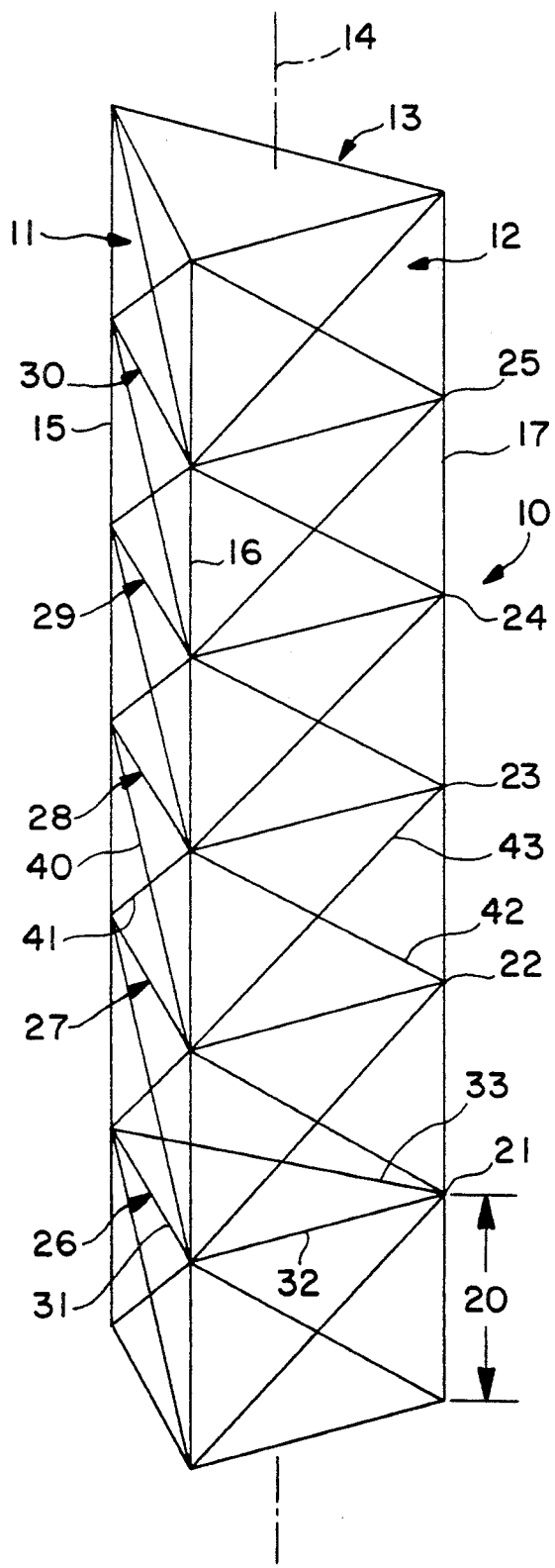
FIG. 1 is a perspective view of an erected triangular lattice structure used in this invention, only two of its faces being shown in detail.

FIG. 1 shows a triangular lattice structure 10 for use with this invention. It is shown in its erected, deployed condition. It has three identical planar faces 11, 12 and 13 which form an open prismatic structure having an axis 14. Faces 11 and 12 are completely shown in FIG. 1. Face 13 is on the back side, and is identical to faces 11 and 12. However, for clarity in disclosure, some of its batten and diagonal members are not drawn in FIG. 1. The erected structure in cross-section is an equilateral triangle.

Three longerons 15, 16 and 17 extend axially and parallel to one another. They are located at respective apices of the triangle. Each is a rod made of unidirectional fiberglass of the type often used in fishing rods and like structures which require stiff flexibility, but substantial compressive strength. The longerons extend unbroken and continuous from end to end of the structure.

The length of the structure is divided into bays of which bay 20 is characteristic. Six of these bays are shown. They are all identical. Nodes 21, 22, 23, 24, 25 are formed along all of the longerons at the junctions of the bays.

Batten frames 26, 27, 28, 29, 30 are formed at the nodes. All are identical, so that only batten frame 26 is described in detail. Three battens 31, 32, 33 are interconnected between adjacent nodes to form frame 26. In this disclosure batten 33 is respective to face 13. Each of these battens is a stiff spring-like blade which when axially loaded between its ends tends toward Euler-column failure. Of course it does not fail. Instead it goes into a bent bow-like shape which exerts an axial separative force forcing its ends apart. When all three battens exert this kind of force against its respective two nodes, there is a strong resultant force tending to form the batten platform as a rigid equilateral triangle.

However, for the structure to be properly supported and dimensioned, it is necessary for the longerons to be forced radially outward, with a continuous force. This requires that the battens be restrained in Euler-type compression to maintain this force.

For this purpose, diagonal members 40, 41, 42, 43 are provided in every bay on every face. Again for clarity in disclosure, the diagonals on face 13 are not shown. They are identical to those on faces 11 and 12. The diagonal members are characterized by tensile strength and by the lack of compressive strength. Cables and chains are examples of suitable materials. When stretched to their full length they support the lattice and hold the battens in their failure mode. When released in the retracted condition, they collapse for ready, small volume storage.

The foregoing defines the basic mast structure. Because of the flexibility of the longerons and the diagonal members, it is possible to coil the longerons into a helical pattern, and the battens and diagonal members will conform as necessary.

As might be expected from a structure which only looks simple, the conversion from a helical configuration to a prismatic configuration under controlled conditions involves some complications. One does not simply release the stored item and stand back, nor without other complications simply pull axially on the erected mast to retract it. Here it should be stated that extension and retraction controls do exist wherein a lanyard pulls axially against the free end of the mast to deploy or retract the mast. However, rotation of the top of the mast usually occurs, which often is undesirable.

Furthermore, the mast converts from a prismatic to a coiled shape in a somewhat complicated way as it passes through a transition section. The transition section represents a region of columnar weakness that is often undesirable. In addition, depending on the specific geometry and structural properties of the various parts of the lattice, it is possible for the transition section to produce a stable twisted structure, rather than a prismatic structure.

This invention proposes to provide a device wherein the structural elements while in the transition section are fully controlled. The transition controls, however, become ineffective for any purpose when the lattice structure is fully erected.

Figure 2:
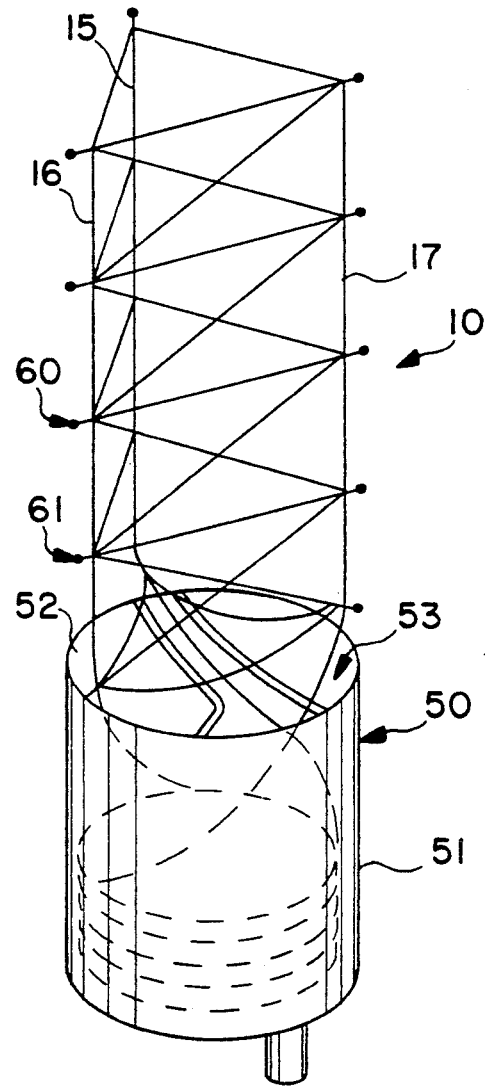
FIG. 2 is a schematic view of the lattice structure of FIG. 1 in the process of being retracted or deployed.
Figure 3:
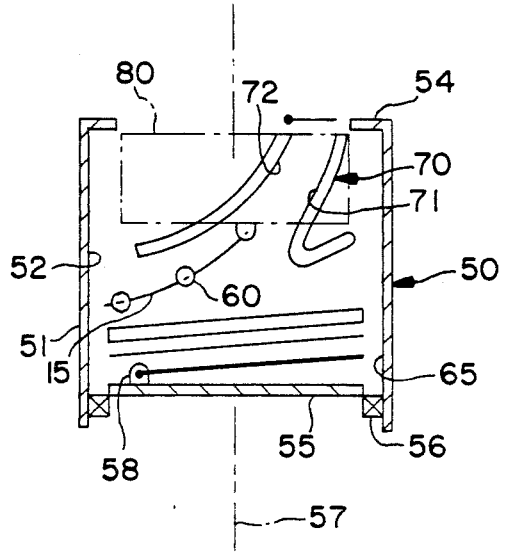
FIG. 3 is a schematic view of the lattice structure of FIG. 1, fully retracted and stored.

FIG. 2 shows lattice structure 10 carried by a cannister 50. For clarity of disclosure, the cannister is schematically shown. It is a drum 51 with an internal cylindrical wall 52 and an open top 53. As will later be shown, a ring shaped rail 54 extends around the open top.

As schematically shown in FIGS. 3-6 and in more detail in FIG. 8, a turntable 55 is mounted to the drum through a bearing 56, to turn around axis 57, independently of the drum. Axis 57 is also axis 14 of the lattice when erected. Again for clarity in FIGS. 2-7, only one longeron is shown, together with its associated apparatus. The others are identical to it. The longerons are mounted to the turntable by hinged supports 58 (FIGS. 3-6, 8 and 9) which push or pull on the end of the respective longeron when the turntable is rotated. It will be recognized that three identical sets of apparatus will be provided, spaced 120 degrees apart around the axis. The helical coils when stored will be interspersed with one another. The longerons are freely slidable along cylindrical wall 52. Only a single longeron 15 is shown in FIGS. 3-6, to simplify the drawings.

The turntable is bi-directionally drivable by motor means 59 mounted to the cannister.

The battens are connected to the longerons by hinged mount means (not shown) which enable their angular relationship to its longeron to change. The respective diagonal members will also be attached to these mount means. This is a conventional attachment of these parts, and enables the mast to go into a coiled configuration for storage.

What is not conventional, and is of substantial importance to this invention is a guide follower 60, 61, 62 at the apices of each batten frame. These project radially beyond the longerons for control purposes during the time when the respective node passes through the transition section. For many or most applications the followers may be as shown in FIG. 7, simple cylindrical parts with respective axes of rotation extending radially in a plane normal to the axis of the lattice. When above the transition section they overhang rail 54.

The cannister has a lower storage section 65 just above the turntable. The transition section 66 is just above the storage section. It is in the transition section that the shape changes from a coil to a prism.

The transition section includes a guide 70 formed as a track. It may have two sides 71, 72 closely to trap the follower, or some play may be allowed. In any event, the guides are engaged by the followers as they pass along them, to constrain the longerons to a permissable path. It is important to note that the longerons while in the transition section are radially inside the guides so that the longerons never contact the guides, and also they never contact rail 54. The only relationship with the guides is with the followers and the only relationship to rail 54 is with the followers.

The longerons have a base length 75 (see FIG. 6) in which the lowermost follower stands above the guides when the longerons are fully extended, then there is no impediment to rotation of the longerons relative to the cannister.

Figure 4:
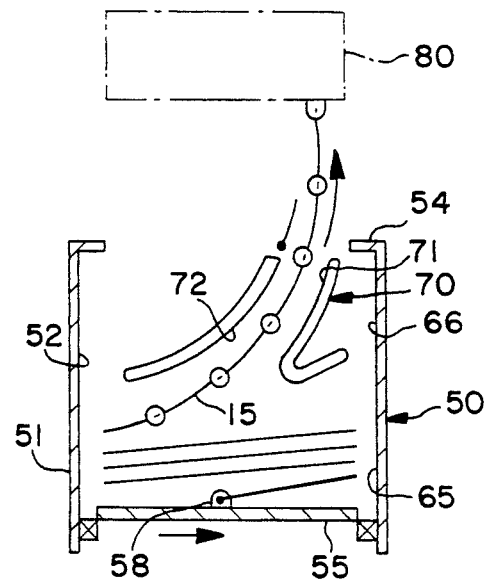
FIG. 4 is a view of the device of FIG. 3 in the process of deployment.
Figure 5:
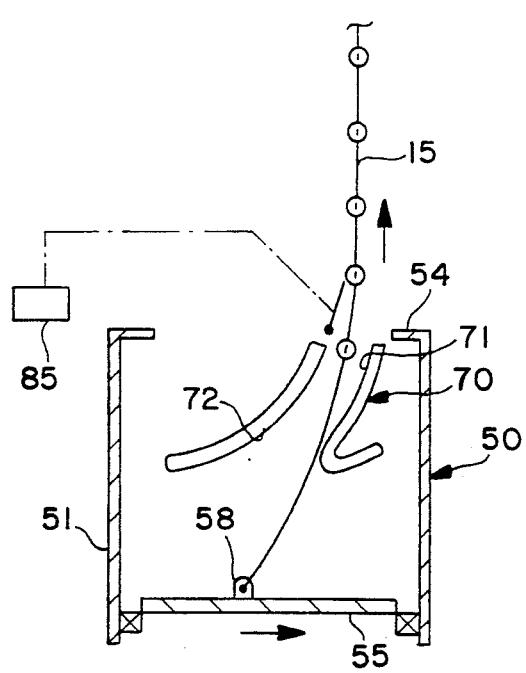
FIG. 5 is a view of the device of FIG. 3 almost deployed.
Figure 6:
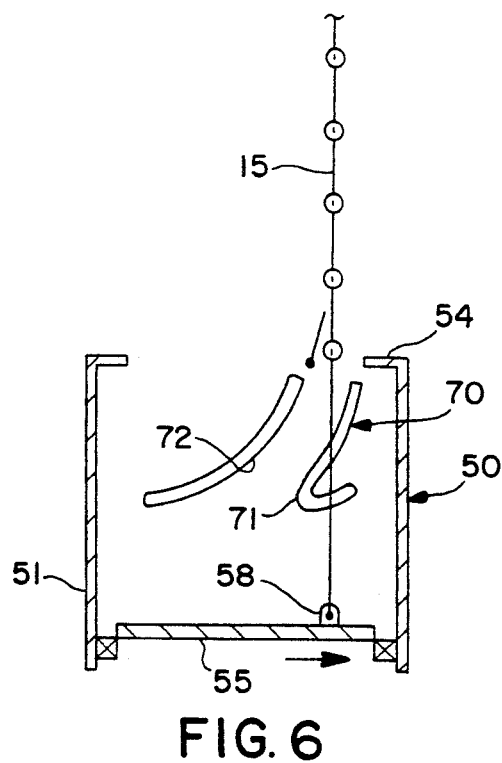
FIG. 6 is a view of the device of FIG. 3 fully deployed and ready to rotate.

FIGS. 3-6 show the progressive extrusion of the stored mast from its fully stored position (FIG. 3) to its fully erected position (FIG. 6).

A payload package 80 is schematically shown on a platform 81 atop the mast. It is drawn into the cannister when stored, if desired.

FIGS. 3-6 show the erection of the mast. Without other provisions, reversal of the turntable will retract the mast. It is for this purpose that peripheral rail 54 extends around the top of the cannister. Until the position of FIG. 6 is reached, only extension of the longerons is possible (or retraction if the turntable is reversed). The guides (as in FIGS. 3-5) prevent rotation of the erected part of the mast around axis 14.

However, when fully extended and without any follower contact with the guides, further rotation of the turntable will rotate the mast as a unit. It is preferable but not necessary for the lowermost of the followers to run along rail 54. However, unless other means were provided, the mast could not be retracted, because the followers are above the guides.

For this purpose a gate 80 is provided at the upper end of each guide. At their simplest, each of the gates is a blade spring-biased toward the closed position shown in FIG. 3, closing a gap in rail 54. Upward passage of the followers will deflect the gate, which will close after the passage of each follower. Then after the last follower has passed, the gate remains closed and the followers cannot reenter the guides to be retracted. In either direction of rotation of the turntable, the lower follower simply rolls over the gates. There results free rotation of the erected mast in either direction.

Actuator means 85 will be provided to open the gate to the position shown in FIGS. 4-6, so that reverse rotation of the mast will bring the lowermost follower into contact with the opened gate. The gate will then act as a diverter to divert the follower into the guide, and the mast will then be retracted, successive followers following along with the longerons. Means 85 may be such as a solenoid to move the gate. The gate if desired may be an over-center toggle construction remaining in its last position until changed by the solenoid.

A complication of this construction is a relatively increased tendency of the erecting mast to sway in the transition section. FIG. 7 shows a shaped wedge-like spacer 86 against which the followers can bear radially in their progression through the transition section. The spacer is shaped to give radial contact support to the followers as they pass through the transition section. This provides side support in this region, which usually has a reduced cross-section.

Figure 10:
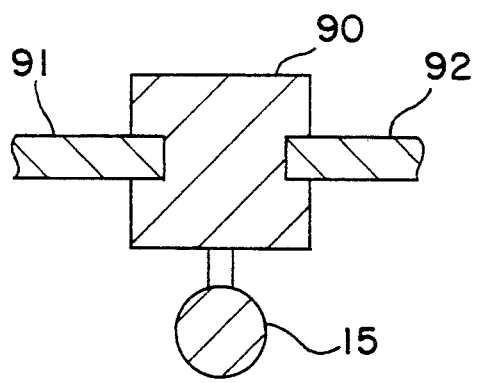
FIG. 10 is a fragmentary cross-section of another embodiment guide.

A somewhat similar situation is shown in FIG. 10, in which follower 90 has a circumferential groove which fits over rails 91, 92 of a guide to give both circumferential and radial support and guidance. These followers are mounted to the structure at the nodes as in the other embodiments, and the track has a suitably contoured configuration.

Figure 11:
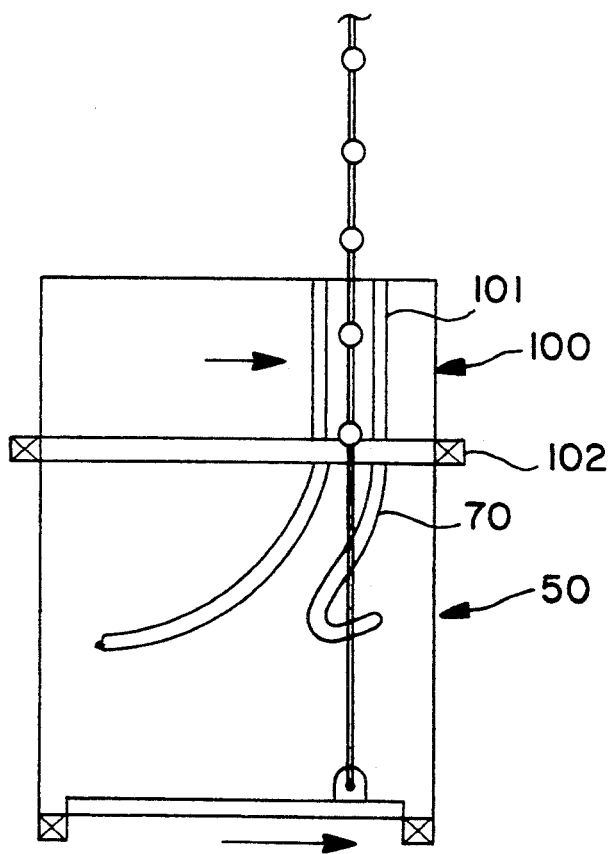
FIG. 11 shows another means for side support of the erected mast.

Yet another means to provide support against sway is shown in FIG. 11, in which a rotatable drum 100 has three vertical tracks such as track 101 which receive the extruded portions of the longerons. Drum 100 is mounted to cannister 50 by bearing 102 and rotates freely with the mast, but does not permit bending of the longerons within its axial length.

Because the transition section functions best when the longerons are fed to it at a known and preferred orientation, it is useful to move the coil of longerons upwardly during erection, rather than feeding from a constantly lowering source. The longerons are slidable along the cannister, and it requires surprisingly little force to move the coil upwardly.

For this purpose, the preferred form of mounting means for each longeron is an erector 105 as shown in FIG. 9. This is useful but optional. One is provided for each longeron in place of supports 58. A lever 106 is pivotally mounted to the turntable and rotates around a center 107. One of its arms 108 is rigidly connected to its respective longeron. The other of its arms 109 is connected to spring bias means 110, also mounted to the turntable.

As best shown in FIG. 9, a housing 110 houses a compression spring 111. A cable 112 has a retention ball 113 connected to one of its ends, and the cable passes through the lever and the spring, terminating at an end restraint 114. The resultant is a bias pull on the ball 113 tending to rotate the lever counterclockwise in FIG. 9 so as to bias the end of the longeron toward its axial, erected position. The result of this is also to bias the helical coil as a unit upwardly so that where it feeds into the guide, it tends to have a uniform spatial relationship. This gives additional assurance of proper extension and retraction. The erector stops when the end of the longeron is axially aligned.

FIG. 8 is a more detailed showing of the mounting of turntable 55. In its preferred construction it comprises an annular ring 120 with an internal gear 121 integral with it. This gear is driven by motor means 59 to turn the turntable. Mount means 58 is attached to the turntable by fasteners 122.

The mount means is a hinge bracket 123 with arms 124, 125 A hinge pin 126 is fitted into the arms to support a receptacle 127 which receives the end of the longeron 15. The longeron and receptacle pivot around pin 126.

A base 130 is mounted to any suitable surface and supports cannister 50, which does not rotate. A pheripheral annular contact bearing 131 is supported by bracket 132. Its two sets of balls 133, 134 which progress around the central axis, enable the inner race of 135 of bearing 132 to rotate around the axis. Bracket 136 joins the inner race to the ring 120. This is a relatively light weight and very reliable mounting means for the turntable. Bracket 132 and 136 will usually be provided as continuous rings and flanges.

The disclosed embodiments provide a mast which can selectively be retracted and deployed and which when deployed, can be rotated without retraction. This is accomplished with only a single drive which functions for all of these purposes. The arrangement also enables substantial lateral support to be provided to the mast while being deployed, and also while deployed, all with a considerably decreased weight penalty for the inclusion of these functions.

This invention is not to be limited to the embodiments shown in the drawings and described in the description which are given by way of example and not of limitation, but only in accordance with the scope of the appended claims.

I claim:

1. In combination with a retractable/deployable triangular lattice mast, said mast comprising three stiffly flexible longerons which when extended from the apices of an equilateral triangular structure having a central axis, the mast when extended being divided into bays by axially spaced apart batten frames and being supported by diagonal members having the properties of tensile strength and compressive collapse, a cannister having an internal cylindrical wall providing a storage section to receive the longerons, battens and diagonal members in a helical configuration, an open top, and a transition section between said top and said storage section, said transition section including guides to receive followers which project beyond the longerons to engage the guides, the longerons themselves being free of said guides, a rotary turntable to which the longerons are attached to be pulled or pushed as the turntable rotates in one direction or the other, and drive means to turn the turntable relative to the cannister, the improvement comprising:

a circumferential rail extending around the top of the cannister said rail being formed as a ring which permits the longerons to rotate freely therein when the mast is erected, said ring having three gate openings, one for each longeron, through which respective followers will pass when the mast is retracted or deployed, a gate at each opening freely permitting the followers to leave the cannister through the openings when the turntable is driven in the direction respective to deployment, and adapted to overlay the openings after the mast is fully deployed, the lowermost of said followers having then passed through said openings, whereby further rotation of the turntable in either direction rotates the deployed mast without interference by the guides, and actuator means for selectively moving said gates into the path of said lowermost follower and open said openings, so as to deflect said followers into the guides and thereby cause retraction of the mast when the turntable is driven in the direction respective to retraction when said gates are moved into said path, thereby to enable retraction of said mast.

2. Apparatus according to claim 1 in which said gates are bi-position stable so as to remain in their most recent opened or closed position until said actuator means changes said position.

3. Apparatus according to claim 1 in which a support drum is rotatably mounted to the top of the cannister, said drum having an internal wall and a plurality of axially extending guides adapted to receive at least a plurality of said followers of each of said longerons to provide additional support to said mast against side sway relative to the cannister.

4. Apparatus according to claim 1 in which said guides include a cam surface facing toward said central axis and radially contacting the followers as they pass through the transition section so as to support the mast structure against side sway relative to the cannister as it passes through the transition section.

5. Apparatus according to claim 4 in which a support drum is rotatably mounted to the top of the cannister, said drum having an internal wall and a plurality of axially extending guides adapted to receive at least a plurality of said followers of each of said longerons to provide additional support to said mast against side sway relative to the cannister.

6. Apparatus according to claim 1 in which said guides comprise a pair of spaced apart elements which leave a spacing between them through which the followers pass during retraction or deployment, said guides forming a recess having a cam surface against which said followers are slidingly fitted for controlled movement toward and away from said axis.

7. Apparatus according to claim 1 in which mount means mounts each said longeron to said turntable, said mount means including an erector tending to bias its respective longeron upwardly in the storage section, whereby to bias the helically stored portion of the longerons toward the transition section.

8. Apparatus according to claim 7 in which said erector comprises a first class lever mounted to said turntable for each of said longerons, and a spring-biased tension member having a pair of arms, one arm being connected to its respective longeron and the other arm being connected to spring biased means.

* * * * *